(12) United States Patent
Chassoulier et al.

(10) Patent No.: US 6,351,049 B1
(45) Date of Patent: Feb. 26, 2002

(54) BALL JOINT TYPE MAGNETIC BEARING FOR TILTING BODY

(75) Inventors: Damien Chassoulier, Mouans-Sartoux; Christian Chillet, Seyssinet-Pariset; Jérôme Delamare, Grenoble; Jean-Paul Yonnet, Meylan, all of (FR)

(73) Assignee: Alcatel, Tokyo (JP)

(*) Notice: Subject to any disclaimer, the term of this patent is extended or adjusted under 35 U.S.C. 154(b) by 0 days.

(21) Appl. No.: 09/599,508

(22) Filed: Jun. 23, 2000

(30) Foreign Application Priority Data

Aug. 9, 1999 (FR) .......................... 99 10 313

(51) Int. Cl.$^7$ .......................... H02K 7/09; F16C 39/06
(52) U.S. Cl. .................. 310/90.5; 74/5.46; 74/5.7; 74/5.72
(58) Field of Search .................. 310/90.5, 162–166, 310/46, 152, 82, 254, 261, 266; 74/5.46, 5.65, 5.6 A, 5.7; 244/177, 170–171, 165–166

(56) References Cited

U.S. PATENT DOCUMENTS

| | | | |
|---|---|---|---|
| 4,611,863 A | 9/1986 | Isely | 310/90.5 |
| 4,785,212 A | 11/1988 | Downer et al. | 310/90.5 |
| 4,874,998 A | * 10/1989 | Hollis, Jr. | 318/568.21 |
| 4,961,352 A | * 10/1990 | Downer et al. | 74/5.46 |
| 5,105,669 A | * 4/1992 | Gruber | 74/5.46 |
| 5,142,932 A | * 9/1992 | Moya et al. | 74/490.05 |
| 5,708,312 A | * 1/1998 | Rosen et al. | 310/90 |
| 5,892,310 A | * 4/1999 | Kempas | 310/152 |
| 6,181,040 B1 | * 1/2001 | Schob | 310/90.5 |

FOREIGN PATENT DOCUMENTS

| | | |
|---|---|---|
| EP | 0 294 760 A1 | 12/1988 |
| EP | 0 338 933 A1 | 10/1989 |
| FR | 2 535 479 A1 | 5/1984 |
| FR | 2 695 968 A1 | 3/1994 |

* cited by examiner

Primary Examiner—Tran Nguyen
(74) Attorney, Agent, or Firm—Sughrue Mion, PLLC

(57) ABSTRACT

A magnetic bearing for centering a first body, which is mobile in tilting, relative to a second body includes:
- a hollow outer part at least part of which is made from a ferromagnetic material and which is attached to the first body and which has an inside surface whose shape is a portion of a sphere,
- an inner part which is attached to the second body and which includes two separate members which are separated by a space and which each include a plurality of (at least three) ferromagnetic areas which are offset angularly about the reference axis, which each define in conjunction with the inside surface of the hollow outer part two air-gaps offset relative to the reference axis and which are each provided with a specific winding adapted to generate magnetic flux lines closing across the two air-gaps, and
- an excitation circuit for selectively applying excitation currents to the windings.

29 Claims, 8 Drawing Sheets

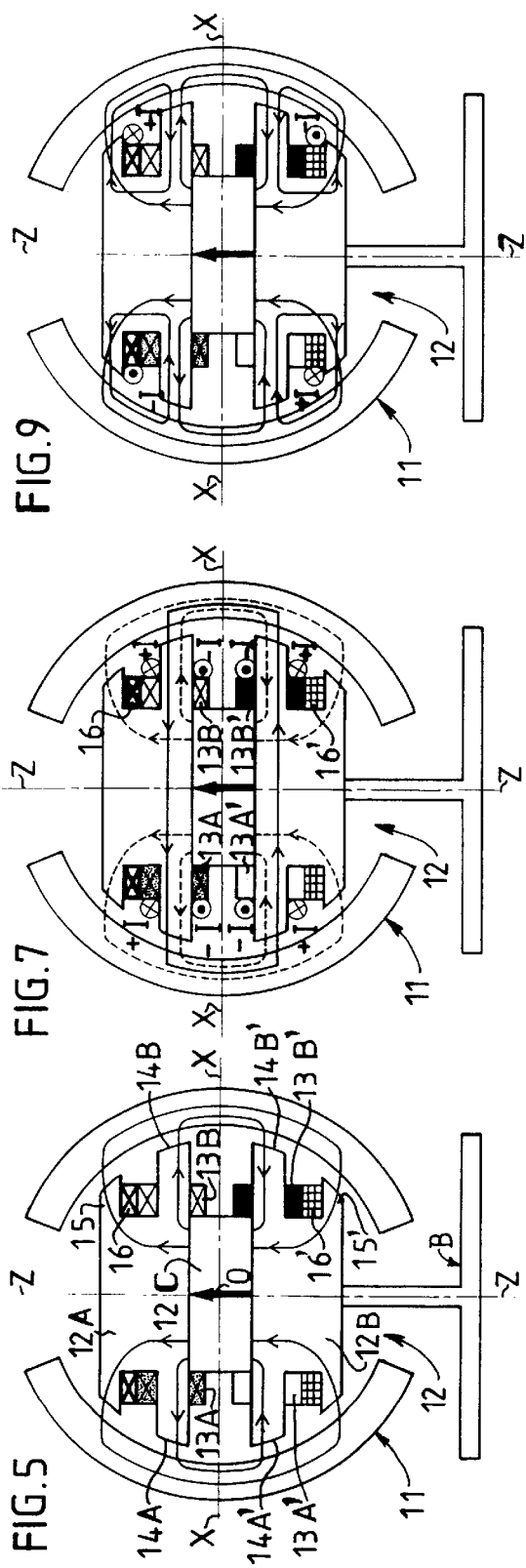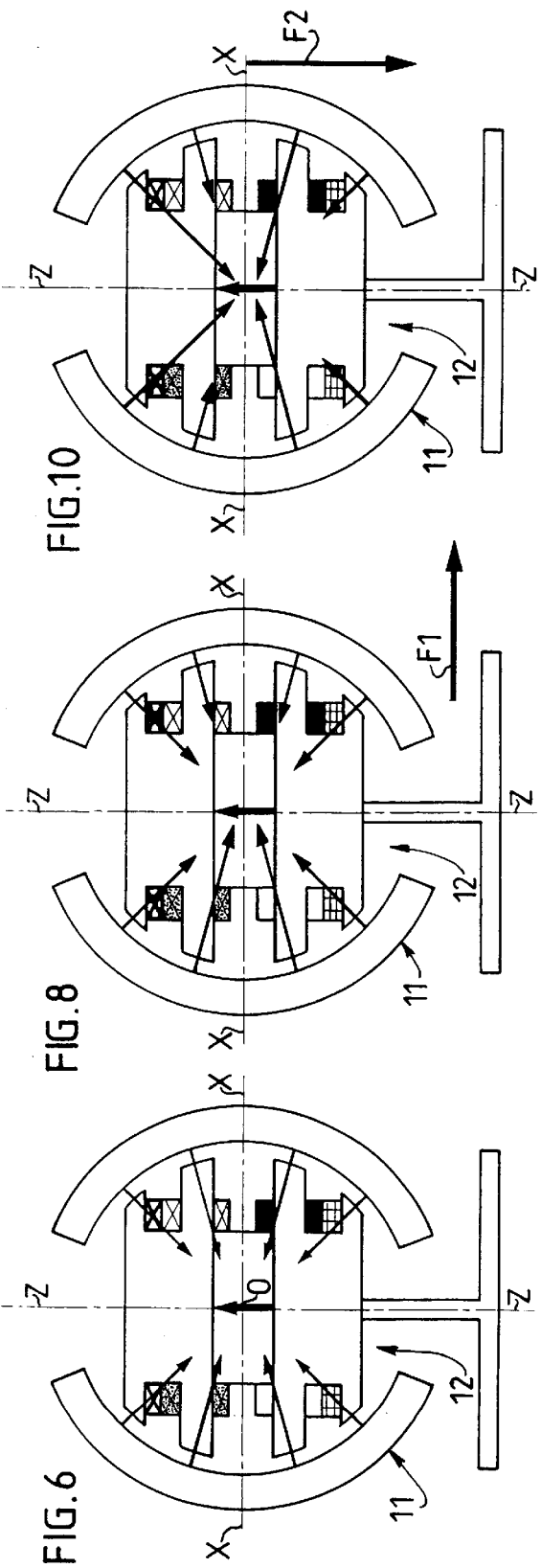

BALL JOINT TYPE MAGNETIC BEARING FOR TILTING BODY

The invention relates to a magnetic bearing for magnetically centering a moving body relative to a fixed body with respect to three axes and preferably for controlling tilting of the moving body.

BACKGROUND OF THE INVENTION

Magnetic centering of one body relative to another body with respect to a given axis can be passive or active, depending on whether the centering magnetic fluxes are generated passively by permanently magnetized means or at least in part actively by an appropriate choice of the amplitude of an excitation current applied to windings. This is known in the art.

For physical reasons, a body cannot be passively centered relative to another body with respect to three non-coplanar axes.

For a given level of centering performance, the use of permanent magnets has the advantage of minimizing the electrical energy required for centering, compared to a configuration with no magnets.

In practice, the body which is to be centered relative to a fixed body can have various degrees of freedom relative to the fixed body. For example, the moving body may be a rotor which rotates continuously or non-continuously about an axis of rotation which often coincides with one of the three centering axes. A configuration like this is of great practical importance, especially in the space field, in momentum wheels or in reaction wheels.

However, to complement such rotation, it may be necessary to control tilting about one or more axes transverse to the rotation axis. Thus in the field of satellites it is beneficial to be able to incline the rotation axis of a momentum or reaction wheel, for example to contribute to satellite attitude control.

Magnetic bearings with the facility for tilting have already been proposed. The document WO89/12178 may be cited in particular.

However, as a general rule, magnetic bearings in connection with which the facility for tilting has been mentioned rapidly lose their centering capability when the tilt exceeds angles of the order of one degree.

OBJECTS AND SUMMARY OF THE INVENTION

The object of the invention is to provide a magnetic bearing (sometimes referred to as a magnetic suspension) for centering a first body, which is mobile in tilting about a tilting center, relative to a second body, which system allows relative tilting through at least 5°, which tilting is significantly greater than that allowed by prior art magnetic bearings and can in particular reach or even exceed tilting angles of plus or minus 15°, without compromising centering performance with respect to three non-coplanar axes and using dedicated components of compact geometry and low power consumption implying only a moderate increase in the weight of the moving body. A subsidiary object of the invention is to provide a magnetic bearing which can also control tilting in the range of movement concerned, which is through at least 5° or even 15° or more.

To this end the invention proposes a magnetic bearing for centering a first body, which is mobile in tilting within an angular range of movement of at least 5° about a center of tilting, relative to a second body having a reference axis passing through the center of tilting, the magnetic bearing including:

a hollow outer part at least part of which is made from a ferromagnetic material which is attached to the first body and which has an inside surface whose shape is a portion of a sphere whose center is substantially coincident with the center of tilting and which extends around a mobile reference axis having an inclination which can be zero to the reference axis on either side of a transverse plane which is perpendicular to the reference axis and passes through the center of tilting, an inner part which is attached to the second body and which includes two separate members which are disposed on respective opposite sides of the transverse plane, which are separated in the direction parallel to the reference axis by a space having a reluctance adapted to prevent the flux lines generated by the group of windings of one of the members crossing this space, which each have a group of windings including at least the specific windings of the ferromagnetic areas and which each include a plurality of (at least three) ferromagnetic areas which are offset angularly about the reference axis, which each define in conjunction with the inside surface of the hollow outer part two air-gaps offset relative to the reference axis and which are each provided with a specific winding adapted to generate magnetic flux lines closing across the two air-gaps, and an excitation circuit for selectively applying excitation currents to the windings of the group of windings of each member to generate magnetic fields in the air-gaps adapted to center the hollow outer part relative to the inner part in directions transverse to and parallel to the reference axis.

Thus there is a very compact inner part on which a few windings are mounted, possibly with a permanent magnet inside the space between the two separate members. The overall size and weight are therefore low. Around this inner part is a hollow outer part whose inside surface is the shape of a hollow sphere (which is why the magnetic bearing of the invention can usefully be referred as a ball joint bearing), so that the air-gaps defined therewith, at a distance from the aforementioned transverse plane, are inclined relative to the reference axis and can contribute to the generation of centering forces parallel to the reference axis.

As just indicated, the space between the two separate members of the inner part can be occupied by a magnet which is permanently magnetized in a direction parallel to the reference axis. The magnet therefore generates magnetic flux lines continuously without consuming electrical energy. On the other hand, no flux lines generated by an electrical current in any of the windings pass through the magnet.

However, another situation of practical importance is that in which this space is a free space forming a large fixed air-gap, i.e. one which does not contain any solid material, with the possible exception of a non-ferromagnetic connecting member for fastening the two members together. This space is filled with vacuum or with air, depending on the environment in which the magnetic bearing is located.

In conjunction with the air-gaps and a ferromagnetic portion of the hollow outer part and the associated specific winding, each ferromagnetic area defines a magnetic actuator. The various magnetic actuators can be independent of each other. However, for ease of manufacture and efficiency, it is beneficial for the ferromagnetic areas of each member to be part of the same ferromagnetic component.

It is also clear that the magnetic bearing is easier and less costly to manufacture if the two separate members have the same geometry. Furthermore, controlling the specific windings of the magnetic bearing is easier if the areas of each member are disposed symmetrically with respect to the transverse plane crossing the space between the separate members.

With the same aim of simplicity, the number of ferromagnetic areas of each member is advantageously an even number and each ferromagnetic area is preferably disposed opposite another ferromagnetic area with respect to the reference axis. In one particularly simple arrangement each member has four ferromagnetic areas divided into two pairs of areas which are diametrally opposed with respect to the reference axis and offset by 90° about the reference axis.

The hollow outer part can have a large angular amplitude, for example plus or minus 50° relative to the transverse plane perpendicular to the reference axis.

Each ferromagnetic area of each member preferably has first and second projections directed towards the inside surface of the hollow outer part to form the air-gaps of that area with the first of the projections surrounded by the specific winding.

The first or second projections of the ferromagnetic areas of a given member advantageously have free edges whose shape is a portion of a common sphere centered on the center of tilting, which guarantees that the air-gaps defined by the first projections likewise have the same radial thickness.

It is of course advantageous for the first and second projections to have edges formed by portions of a single sphere, so that all the air-gaps on one side of the transverse plane are equal. The projections of the two members preferably have edges on a common sphere so that all the air-gaps are normally equal, which facilitates determining and generating the flux variations needed for centering and tilting.

Two main configurations can be distinguished, according to whether the whole of the projections farthest from the transverse plane continuously face the inside surface of the hollow outer part or not, regardless of the inclination of the hollow outer part relative to the inner part, within the range of movement in tilting.

The simplest situation is that in which the above condition is satisfied.

In the contrary case, which is slightly more complex, the existence of air-gaps of varying section enables tilting torque to be generated by appropriate excitation of the windings without requiring components additional to those already mentioned.

The centering and tilting control functions are then obtained from a compact system which is contained within the overall size of the hollow outer part.

The projections in the ferromagnetic areas of a given member farthest from the transverse plane then advantageously have free edges whose shape is a globally trapezoidal portion of a common sphere centered on the center of tilting with each of the globally trapezoidal portions having one side extending to the vicinity of the reference axis. Allowing for the spaces which separate them circumferentially for fitting the windings, the second projections therefore conjointly form a spherical dome which maximizes the amplitude of the possible range of movement in tilting and guarantees that normally, in the correctly centered configuration of the hollow outer part, the air-gaps defined by the second projections and the inside surface of the hollow outer part are of the same thickness.

In this case, although it is not necessary for the second projections to be individually symmetrical about the transverse plane, for the two circular edges of the inside surface of the hollow outer part to have the same radius and for the projections at the ends to extend as far as the vicinity of the reference axis, it is nevertheless preferable for the two pluralities of second projections of the two members to be symmetrical from the point of view of their angular amplitude in a plane passing through the reference axis. This guarantees some degree of symmetry of tilting control performance.

In the first case, the projections farthest from the transverse plane are advantageously parts of a common annular projection, which helps to facilitate manufacture of the member. The annular projection is advantageously on the opposite side of the transverse plane crossing the space between the members to the first projections. Because the inner part has the overall shape of a ball, the specific windings can be located in a region of greater diameter which optimizes the number and size of the windings that can be mounted in the magnetic bearing.

In the first case, an additional winding is advantageously disposed around each member, between the first and second projections in the ferromagnetic areas. This provides a particularly simple way of generating flux lines distributed all around the reference axis, either in conjunction with the aforementioned specific windings or not.

Of course, these additional windings are connected to the excitation circuit, which is designed for selective application of excitation currents to the additional windings. In fact, the magnetic fluxes that such additional windings generate participate in centering the hollow outer part in the direction parallel to the reference axis. This is because the specific windings of each of the ferromagnetic areas can also be electrically energized to assure some or all of the centering parallel to the reference axis.

In each case, the specific windings of the ferromagnetic areas can simply be wound around one of the projections in the ferromagnetic area concerned. This projection can be the first or second projection in that area. However, for accurate control of the path of the flux lines, and therefore of the magnetic flux crossing each of the air-gaps, each ferromagnetic area includes two specific windings wound around the first and second projections, respectively.

The specific windings of the ferromagnetic areas of a given member are advantageously adjacent, at least in the circumferential direction, which maximizes the cumulative surface area of the free edges (and therefore the associated air-gaps) of the projections around which these windings are wound. If each ferromagnetic area has two windings, they are preferably also adjacent (in the direction parallel to the reference axis), which maximizes the cumulative surface area of the edges of the projections in that ferromagnetic area.

In the first case the hollow outer part can have a single opening to enable fastening of the members to an external frame and the hollow outer part intersects the reference axis on the opposite side of the single opening.

In the first case tilting control can be obtained by additional means. The tilting control means include, for example, externally of the hollow outer part:

two permanently magnetized rings which are carried by a first ferromagnetic armature attached to the hollow outer part around the reference axis, which each have a magnetization direction which passes at all points at least approximately through the reference axis, which are parallel to each other and offset in the direction parallel to the reference axis on respective opposite sides of the center of tilting and which have free edges substantially constituting portions of a common sphere centered on the center of tilting, and an annular plurality of tilt windings which are attached to the inner part, which each include two groups of circumferential strands respectively adapted to face each of the permanently magnetized rings regardless of the orientation of the hollow outer part relative to the center of tilting within said range of angular movement in tilting of at least 5° and which are carried by a second ferromagnetic armature defining in conjunction with the magnetized rings air-gaps whose thickness remains constant throughout said range of angular movement in tilting.

Clearly, a constant air-gap between the second ferromagnetic armature and the free edges of the magnetized rings guarantees constant tilt control performance within a range of movement in tilting of at least 5°. Also, the magnetization direction of the rings is preferably locally directed towards the center of tilting, which has the advantage that it maximizes the flux lines crossing the air-gap.

The two permanently magnetized rings preferably have the same diameter and are preferably symmetrical to each other about the center of tilting and the tilt windings are preferably symmetrical about the transverse plane. This facilitates the manufacture of the tilt control means. In practice, this symmetrical positioning of the tilt control means makes the range of movement in tilting symmetrical about the transverse plane passing through the center of tilting.

The spacing of the two rings in a plane containing the reference axis preferably corresponds to an angular offset of at least 10° relative to the center of tilting. In the aforementioned situation in which the rings are symmetrical about the transverse plane, this amounts to the two rings defining an angular offset of at least ±5° relative to the transverse plane passing through the center of tilting.

To maximize the efficacy of the tilt control means, the circumferential strands of each group of windings are disposed adjacently on a spherical surface of the second armature concentric with the center of tilting. This side-by-side disposition of the circumferential strands of each group has the advantage of minimizing the thickness of the air-gaps in which those strands are located.

It has been stated that the circumferential strands of the tilt windings continue to face the magnetized rings throughout the range of movement in tilting. To this end, the rings can have an angular amplitude in a plane passing through the reference axis less than that of each group of circumferential strands of each winding. In this way, in any tilting configuration, the whole of the free edge of the magnetized rings faces the circumferential strands. However, in a different embodiment, the rings have an angular amplitude in this plane passing through the reference axis which is greater than that of each group of circumferential strands of each winding, in which case the circumferential strands of each group remain at all times within one of the air-gaps defined by one of the annular rings.

The second armature (that carrying the tilt windings) is preferably disposed radially between the hollow outer part and the first armature (that carrying the magnetized rings).

BRIEF DESCRIPTION OF THE DRAWINGS

Objects, features and advantages of the invention will emerge on reading the following description which is given by way of non-limiting example and with reference to the accompanying drawings, in which:

FIG. 5 is a view analogous to that of FIG. 1, showing the magnetic flux lines generated by the central magnet;

FIG. 6 is a view similar to that of FIG. 1, in which arrows show the amplitude and the direction of the forces generated by the magnetic fluxes crossing the air-gaps;

FIG. 7 is a view analogous to that of FIG. 5, showing flux lines generated by the application of excitation currents to certain windings;

FIG. 8 is a view analogous to that of FIG. 6, with arrows whose amplitude is modified relative to those in FIG. 6 because of flux lines generated by the excitation currents in the windings;

FIG. 9 is another view similar to that of FIG. 5, showing other flux lines generated by the current flowing in other windings;

FIG. 10 is a view similar to that of FIG. 6 in which the amplitude of the arrows allows for the flux lines generated by the windings shown in FIG. 9;

MORE DETAILED DESCRIPTION

Figure 1:
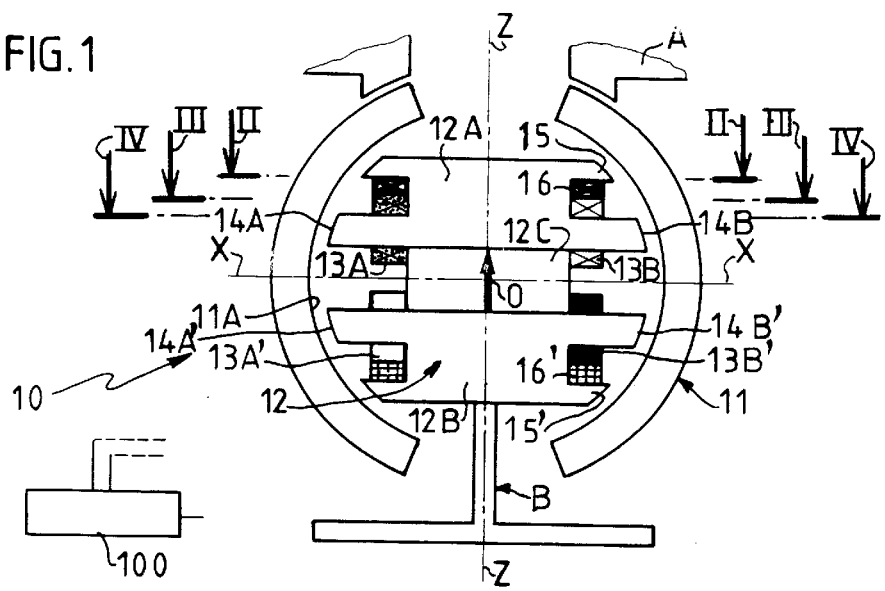
FIG. 1 is a sectional view in a plane containing a reference axis Z—Z of a first ball joint type magnetic bearing according to the invention.
Figure 2:
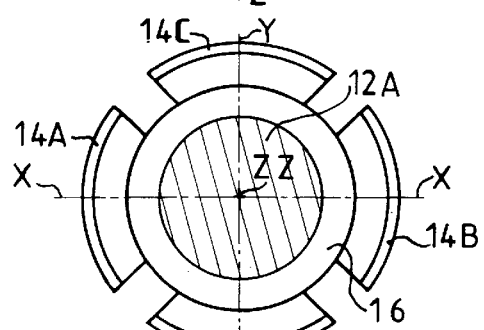
FIG. 2 is a view of the inner part of the bearing in cross-section taken along the line II—II in FIG. 1.

FIG. 1 shows a magnetic bearing 10 for centering a first body A, which can tilt within a range of angular movement of at least 5° about a center O of tilting, relative to a second body B which has a vertical reference axis Z—Z passing through the center of tilting.

The magnetic bearing has a hollow outer part 11 fastened to the first body A and an inner part 12 fastened to the second body B.

The hollow outer part 11 has an inside surface 11A whose shape is a portion of a sphere whose center is substantially coincident with the center O of tilting. The hollow outer part extends completely around the reference axis Z—Z on both sides of a transverse plane perpendicular to the reference axis passing through the center O of tilting. In FIG. 1, that transverse plane is defined by an axis X—X transverse to the reference axis Z—Z at point O.

The hollow outer part 11 is at least partly made from a ferromagnetic material of any suitable type known in the art.

The inner part 12 includes two separate members 12A and 12B on respective opposite sides of the transverse plane defined above and separated in the direction parallel to the reference axis by a space 12C which has a high reluctance.

Each member includes a plurality of (at least three) ferromagnetic areas offset angularly around the reference axis. In conjunction with the inside surface 11A of the hollow outer part 11 each area defines two air-gaps and has a specific winding 13A, 13B, 13C or 13D adapted to generate magnetic flux lines which are closed via these two air-gaps.

Figure 3:
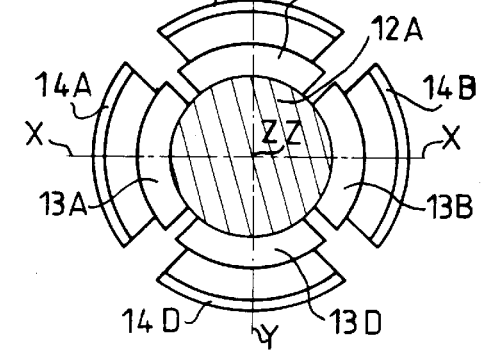
FIG. 3 is a view of the inner part of the magnetic bearing from FIG. 1 taken along the line III—III.
Figure 4:
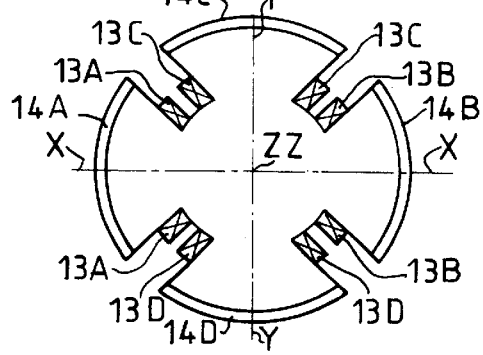
FIG. 4 is another view of the inner part of the magnetic bearing from FIG. 1 in cross-section taken along the line IV—IV.

In the example shown in FIG. 1, and as is apparent from FIGS. 3 and 4, this plurality of ferromagnetic areas is preferably formed of two pairs of ferromagnetic areas which are diametrally opposed with respect to and angularly offset 90° around the reference axis.

To be more precise, there is one pair of ferromagnetic areas aligned with the centering axis X—X in FIG. 1 and one pair of ferromagnetic areas for centering with respect to a third axis Y—Y perpendicular to the aforementioned axes X—X and Z—Z.

Each ferromagnetic area of each member has first and second projections directed towards the inside surface of the hollow outer part to form the air-gaps of that ferromagnetic area. One of these projections, referred to as the first projection, has said specific winding wound around it. To be more precise, as seen in FIGS. 1 to 4, the upper member 12A (what follows is equally valid for the lower member 12B) has an annular series of four projections 14A, 14B, 14C and 14D whose edges, which are concentric with the center O of tilting, define one of the two air-gaps in each ferromagnetic area.

The member 12A further includes, at a distance from this annular series of four projections, a continuous annular projection 15 whose edge is also concentric with the center of tilting. The annular projection defines the second air-gap in each of the ferromagnetic areas.

The edges of the various projections are preferably portions of a common sphere so that all the air-gaps are the same thickness.

The various ferromagnetic areas of each member can be separate. However, for simplicity the various ferromagnetic areas form part of a common ferromagnetic component (here the whole of the member 12A).

As seen in FIGS. 3 and 4, the windings 13A to 13D around the respective projections 14A to 14D are substantially adjacent in the circumferential direction.

The group of windings that each member includes advantageously further includes an additional winding 16 (16' in the case of the lower member) wound around the member 12A between the first and second projections of the ferromagnetic areas. The additional winding 16 is preferably adjacent the specific windings 13A to 13D so that all of the space between the projections is occupied either by one of the specific windings or by the additional winding.

Note in FIG. 1 that the specific windings, on the one hand, and the additional winding, on the other hand, extend along a cylindrical portion of the member 12A which has the same diameter of course, in an alternative embodiment, not shown, the additional winding can extend around a portion whose diameter can be different to that of another cylindrical portion along which the specific windings run. As an alternative to this, the specific windings can be disposed in a configuration closer to a polygon.

Whether it is a specific winding or the additional winding, and whether it is part of the upper member or the lower member, each winding is connected to an excitation circuit 100 adapted to apply an appropriate excitation current to each of the windings.

In the example shown in FIG. 1, the space 12C between the two members 12A and 12B is occupied by a permanent magnet which is axially magnetized in the upwards direction. This magnet has a reluctance adapted to prevent flux lines generated by the group of windings of either member flowing across this space.

In an alternative embodiment, not shown, the space 12C can be free of magnets, essentially constituting an air-gap having the required reluctance. The members 12A and 12B can of course be totally independent of each other if they are respectively fixed at the bottom and at the top. However, the foregoing description of an air-gap of very high reluctance remains valid if there is a connection for fastening the members 12A and 12B together, provided that the connection has sufficient reluctance to prevent significant flow of flux lines generated by the windings.

FIGS. 5 to 14 show either magnetic flux lines or resulting forces in the air-gaps for various winding excitation configurations. To make FIGS. 5 to 14 easier to read, windings of which only the edge can be seen are represented differently for each winding.

For example, in FIG. 5, the additional winding 16 of the upper member 12A is readily identified, together with the two diametrally opposed specific windings 13A (on the left) and 13B (on the right).

It will be remembered that, by convention, a circle containing a dot near the edge of a winding indicates that a current is flowing in the direction out of the plane of the drawing and that a circle containing a cross corresponds to the opposite current direction. What has just been stated is valid for the lower member 12B (since, in this example, it has the same geometry as and is disposed symmetrically to the upper member about the transverse plane passing through the center 0) and the windings of the lower member are identified by the same reference numbers as the windings of the upper member but "primed".

FIG. 5 includes a simplified representation of the magnetic flux lines generated by the permanent magnet occupying the space 12C between the members 12A and 12B.

Note, on the right and on the left in FIG. 5, small magnetic loops crossing the air-gaps nearest the transverse plane, near the projections 14A and 14B in the case of the upper member, and larger magnetic loops crossing the air-gaps at the ends, formed between the hollow outer part and the annular projections 15 (and 15' in accordance with the aforementioned notation used for the lower member) at the ends.

The passage of magnetic flux lines across an air-gap produces a force transverse to the air-gap whose amplitude increases in direct proportion to the number of magnetic flux lines crossing the air-gap.

Because the magnet is disposed symmetrically with respect to the reference axis, which implies that the magnetic flux lines generated by the magnet are uniformly distributed all around the reference axis, it is clear that, when the hollow outer part is correctly centered relative to the center O of tilting, the passage of the magnetic flux lines across the various air-gaps generates forces in those air-gaps on the hollow outer part which are symmetrical, on the one hand about the reference axis and on the other hand about the horizontal transverse plane. This is shown in FIG. 6 by a set of arrows all converging towards the center O of tilting and which have moduli which are diagrammatically represented as being the same. For the hollow outer part, the resultant force is of zero amplitude: the hollow outer part does not move.

FIG. 7 shows the flux lines crossing the air-gaps when two specific windings of each of the members which are symmetrically disposed with respect to the transverse plane, i.e. the windings 13A, 13B and 13A', 13B' in FIG. 5, are energized by the excitation circuit 100 shown in FIG. 1 to generate flux lines in the upper member crossing the air-gaps in a common direction (here towards the left) and flux lines in the lower member crossing the corresponding two air-gaps in the opposite direction (towards the right in the FIG. 7 example). Because, as already mentioned, the lower and upper members are solid ferromagnetic material components, the flux lines generated by the aforementioned windings can combine, as shown in FIG. 7, to form a single magnetic loop passing through the upper member towards the left, descending in the hollow outer part, passing through the lower member towards the right and rising in the hollow outer part.

The symmetry of the magnetic fluxes crossing the air-gaps at the ends between the hollow outer part and the annular projections is preserved. On the other hand, in the case of the air-gaps nearest the transverse plane of symmetry, the magnetic loop generated by applying excitation currents to the aforementioned windings clearly increases the flux crossing the air-gaps on the left and reduces the magnetic flux crossing each of the air-gaps on the right. As shown in FIG. 8, this increases the forces generated at the left-hand air-gaps and reduces the forces generated at the right-hand air-gaps. The resultant force F1 (FIG. 8) is substantially parallel to the transverse plane. FIGS. 7 and 8 therefore correspond to a mode of excitation of the windings adapted to center the hollow outer part transversely to the reference axis and with respect to the axis X—X in FIGS. 1 and 3. Clearly, by applying excitation currents to the other pairs of windings, namely those on the axis Y—Y in FIG. 3, a transverse centering force with respect to the axis Y—Y can be obtained in a similar manner. It is of course possible to combine excitation currents in each of the pairs of windings, as required, to have at all times an appropriate centering force in the transverse plane perpendicular to the reference axis Z—Z.

FIG. 9 corresponds to another example of excitation of the windings in which the two additional windings (16 and 16' in FIG. 5) are energized to generate magnetic flux lines which are directed outwards in the case of the air-gaps defined by the annular projections at the ends and inwards in the case of the projections nearest the transverse plane.

Clearly there is an overall increase in the magnetic flux across the air-gaps defined by the upper annular projection at the end and a reduction in the flux in the air-gaps defined by the lower annular projection; similarly, there is a reduction in the flux lines in the air-gaps near the transverse plane in the upper member and an increase in the flux lines crossing the air-gaps of the lower member near the same transverse plane. Because the air-gaps in which the maximum magnetic flux lines travel in the upper member are more inclined to the reference axis than the air-gaps of the lower member which are crossed by a maximum of magnetic flux lines, a downward resultant force is produced, parallel to the reference axis. FIGS. 9 and 10 therefore correspond to a mode of excitation of the windings corresponding to centering of the hollow outer part in the direction parallel to the reference axis.

Clearly, by reversing the direction of the excitation currents flowing in the additional windings, it is possible to obtain a centering force in the direction opposite that designated by the arrow F2 in FIG. 10.

Note that, with regard to centering in the direction of the transverse plane, only the specific windings are electrically energized, and not the additional windings.

With regard to centering in the direction parallel to the reference axis, the same remarks apply since flux lines identical to those shown in FIG. 9 can be obtained by exciting the specific windings appropriately, rather than the additional windings. Consequently, it is clear that centering forces with respect to any of the three axes X—X, Y—Y, Z—Z can be obtained independently of the presence of the additional windings 16 and 16'. It is nevertheless clear that the presence of the additional windings 16 and 16' makes centering with respect to the axis Z—Z very easy. It is nevertheless possible, in accordance with the invention, to provide only the specific windings, for centering with respect to the three axes, with no additional windings at all.

The foregoing description was easy given the symmetry of the two members and the disposition of the windings, and given that each of the members includes two pairs of windings disposed on respective opposite sides of the reference axis and angularly offset by 90°.

It is nevertheless clear that, at the cost of a slight complication in how the excitation currents of the various windings are controlled, it is possible to obtain centering forces transverse to the reference axis and centering forces parallel to the reference axis provided that each of the upper and lower members includes at least three windings, in three ferromagnetic areas, disposed symmetrically or otherwise about the transverse plane in each of the members.

FIGS. 11 to 14 are variants of FIGS. 7 to 10.

From a structural point of view, the magnetic bearing shown in FIGS. 11 to 14 is simpler than that shown in the previous figures because the space between the lower and upper members is essentially empty, forming a wide air gap occupied only by a narrow connector for fastening the upper and lower members together and in theory made of a non-ferromagnetic material.

Furthermore, as emerges below, FIGS. 11 to 14 show that it is possible to apply centering forces with respect to any axis by exciting a smaller number of windings than described with reference to FIGS. 7 to 10.

Figure 11:
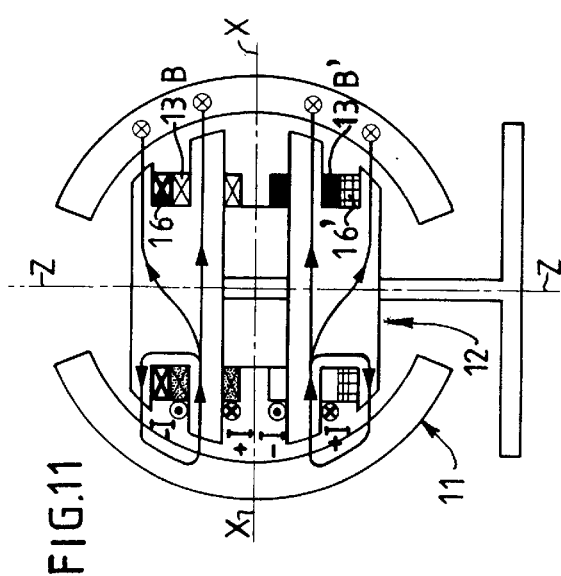
FIGS. 11 and 12 are variants of FIGS. 7 and 8 relating to a different embodiment of the bearing.
Figure 12:
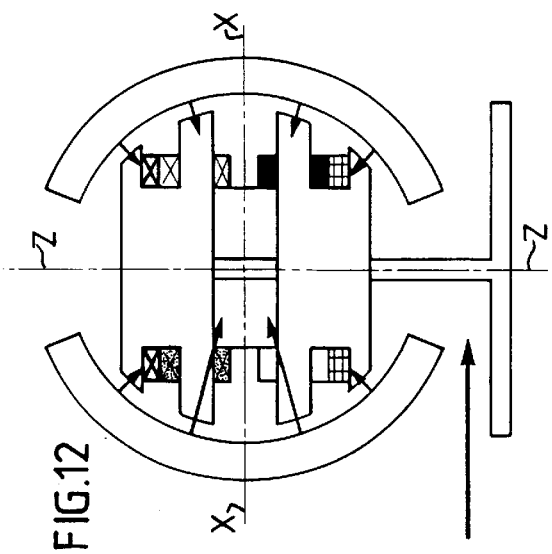

Accordingly, in the FIG. 11 example, only one specific winding of each of the members is activated, namely the specific winding on the left (13A or 13A' in FIG. 5). Here these windings are electrically energized to generate flux lines leaving the specific winding and closed through all the other air-gaps of each part 12A and 12B. As shown in FIG. 12, this generates forces towards the center of tilting in all the air-gaps and of high amplitude in the air-gap associated with the excited winding and of low amplitude in all the other air-gaps. Because of the symmetrical configuration of the air-gaps on either side of the transverse plane, this generates a resultant force F'1 parallel to the transverse plane, directed towards the right. It therefore suffices to activate two well-chosen specific windings to center the hollow outer part with respect to an axis transverse to the reference axis Z—Z.

Figure 13:
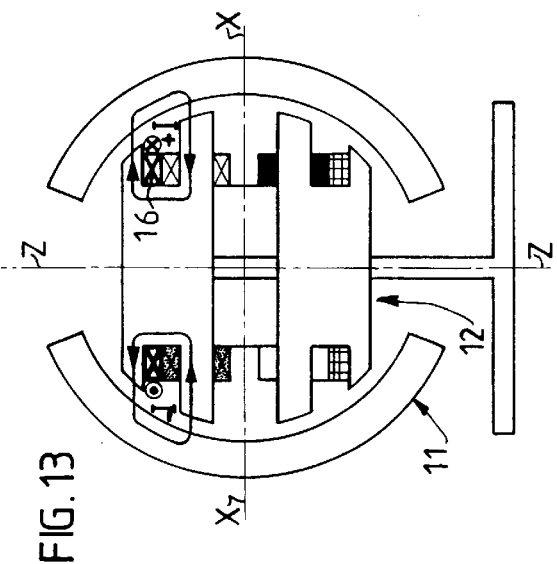
FIGS. 13 and 14 are variants of FIGS. 9 and 10.
Figure 14:
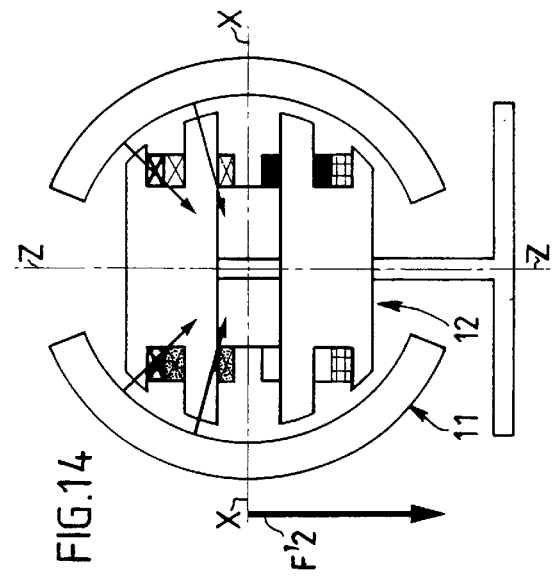

In FIG. 13, only one winding, namely the additional winding 16 of the upper member, is electrically activated, which produces flux lines only in the air-gaps of the upper member. As can be seen in FIG. 14, this generates forces in the air-gaps of the upper member directed towards the center of tilting. This produces a vertical downward resultant force F'2 in the direction parallel to the reference axis Z—Z.

Once again, as explained with reference to FIGS. 9 and 10, it would be possible to obtain this centering in the direction parallel to the reference axis by activating two or even all the windings of only one of the members, independently of the presence or absence of an additional winding.

As stated above, it is possible to eliminate the additional windings. It is of course easy, if required, to generate high centering forces in the direction parallel to the reference axis by simultaneously activating some of the specific windings and the additional winding of one or both ferromagnetic members.

Figure 15:
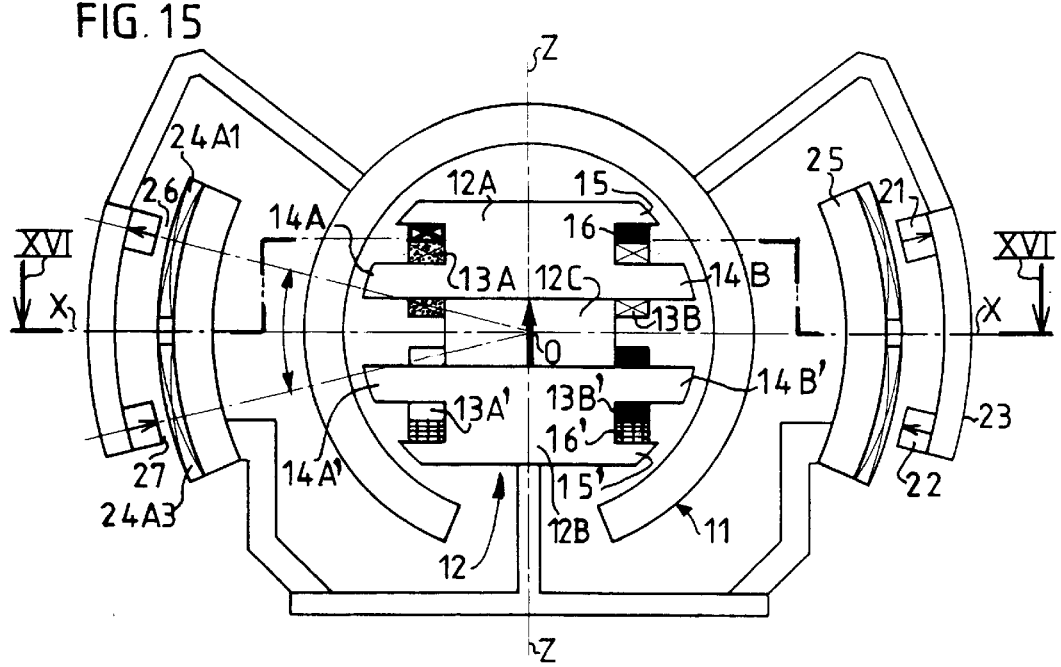
FIG. 15 is a view of another embodiment of a ball joint type magnetic bearing according to the invention in section taken along the reference axis Z—Z.
Figure 16:
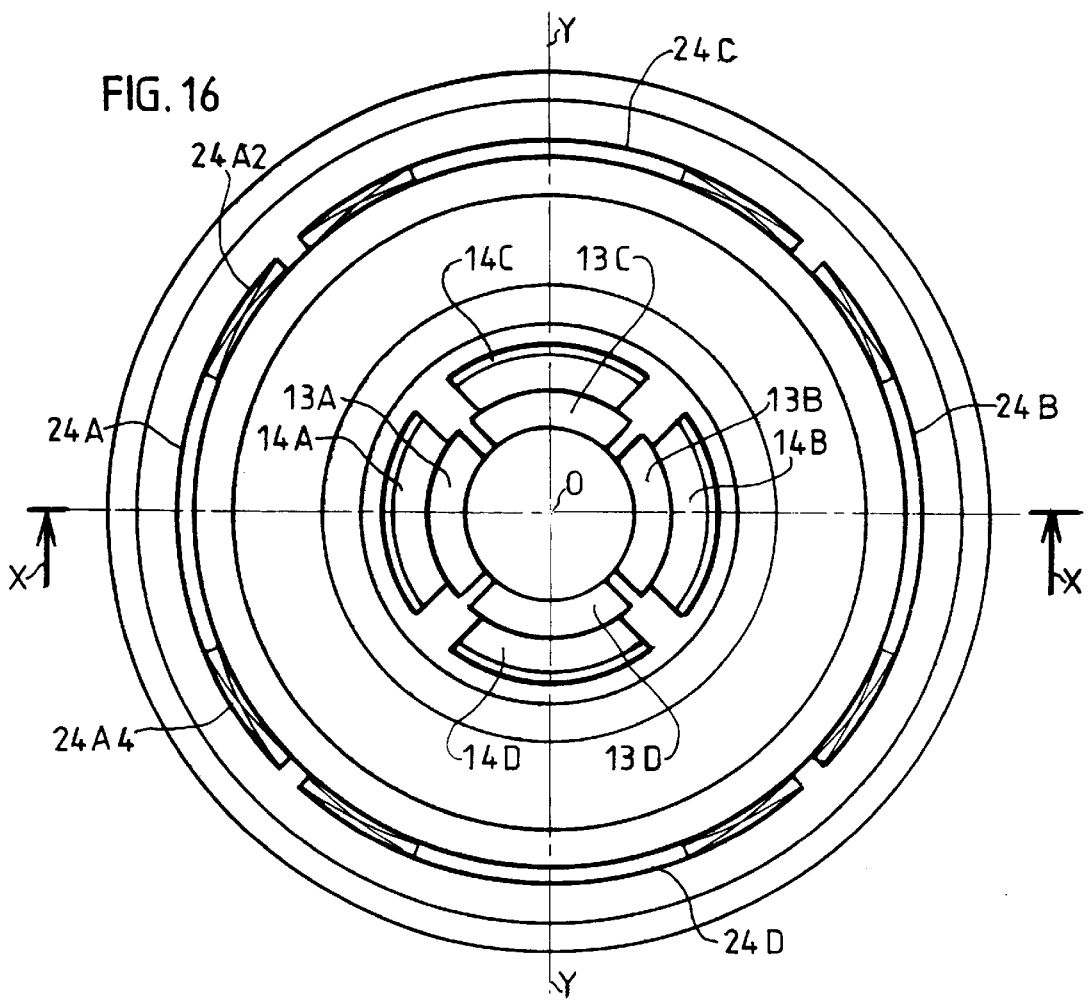
FIG. 16 is a view of the bearing in cross-section taken along the broken line XVI—XVI.

FIGS. 15 and 16 show a bearing substantially conforming to that of FIGS. 1 to 10 and further including tilt control means.

The tilt control means include, externally of the hollow outer part 11:

two permanently magnetized rings 21 and 22 carried by a first ferromagnetic armature 23 fastened to the hollow outer part; and an annular plurality of tilt windings 24A, 24B, 24C, 24D (FIG. 16) carried by a second ferromagnetic armature 25 fastened to the inner part.

The first ferromagnetic armature 23 and each of the two permanently magnetized rings 21 and 22 extend completely around the reference axis.

Each of the rings 21 and 22 is magnetized in a direction which is at least approximately radial. In other words, in a direction which passes at all points at least approximately through the reference axis. As seen in FIG. 15, this direction preferably passes at all points substantially through the center of tilting.

The permanently magnetized rings are magnetized in opposite directions. In other words, as seen in FIG. 15, one of the rings, here the upper ring 21, is magnetized in the outward direction and the other ring, here the lower ring 22, is magnetized in the direction towards the reference axis.

Each of the two rings has a free edge and the two free edges of the two rings are both directed either towards the reference axis (FIG. 15) or away from it. The two free edges are two portions of a common sphere concentric with the center of tilting of the bearing.

The two rings are disposed in substantially parallel planes offset in the direction parallel to the reference axis on respective opposite sides of the center of tilting.

In a different embodiment, not shown, the combination of the first armature 23 and the two rings 21 and 22 is replaced by an assembly of two annular ferromagnetic parts having free edges of the previously mentioned type joined together by one or more rings permanently magnetized in the direction parallel to the reference axis, for example. This produces the same flow of flux lines.

Each of the tilt windings includes two groups of circumferential strands respectively adapted to face each of the free edges, namely, in this example, to face each of the rings 21 and 22. To be more precise, referring to the winding 24A, FIG. 15 shows two groups of circumferential strands 24A1 and 24A3 which are joined to form a loop by two groups of axial strands 24A2 and 24A4 (see FIG. 16).

In conjunction with the aforementioned free edges, the second ferromagnetic armature 25 defines air-gaps 26 and 27 whose thickness in the radial direction is constant throughout the range of angular movement in tilting of the hollow outer part relative to the inner part, i.e. within a range of angular movement which in practice is not less than 5°.

The magnetic circuit portion formed by the first ferromagnetic armature 23 and the two permanently magnetized rings 21 and 22 is symmetrical about the center of tilting and about the transverse plane.

In a plane containing the reference axis, for example the plane of FIG. 15, the free edges of the two rings are spaced by a distance corresponding to an angular offset of at least 10° relative to the center of tilting. In other words, the angle between two lines in FIG. 15 passing through the center O of tilting and the middle of the air-gaps 26 and 27, as seen in the left-hand part of FIG. 15, is at least 10°.

These circumferential strands of each group of windings, for example the strands of the groups 24A1 and 24A3, are disposed adjacently on a spherical surface of the second armature 25 which is concentric with the center of tilting. The tilt windings are therefore very flat.

In this example, the rings have an angular amplitude in the plane passing through the reference axis, for example the plane of FIG. 15, less than that of each group of circumferential strands of each winding. This is because the angle at which the free edge of each ring is seen in FIG. 15 is of the order of one-quarter the angle at which the group of circumferential strands 24A1 or 24A3 is seen from the center of tilting in FIG. 15.

Consequently, there is a substantially constant number of circumferential strands in the air-gap defined between the second armature and the free edge of the magnets, regardless of the angular position in tilting of the hollow outer part, and therefore regardless of the position of the first armature relative to the center of tilting.

The magnetic flux crossing the air-gaps 26 and 27 is maximized when the direction of permanent magnetization of the rings converges towards the center of tilting, i.e. when that direction is perpendicular to those air-gaps. It is nevertheless clear that the loss of performance will be modest if the rings have directions of magnetization perpendicular to the reference axis in order to simplify manufacture.

When a current flows in one of the windings, for example the winding 24A, a force is generated between the two armatures 23 and 25 which is defined by the vector product of the magnetic fields in the air-gaps and the overall current flowing in the air-gaps.

Because the strands which are essentially in the magnetic field of the rings are elongate in the direction parallel to the air-gaps and in the direction parallel to the rings and the direction of the current and the flux change conjointly for each group of strands, there is clearly a non-zero vertical resultant force in the direction parallel to the reference axis Z—Z. A tilting torque about the center of tilting can clearly be obtained by causing currents to flow in two tilt windings on respective opposite sides of the reference axis.

In the example shown, the second armature 25 is radially between the hollow outer part 11 and the first armature 23. It is nevertheless clear that the second armature can instead be radially outside the first armature 23. The connection between the hollow outer part 11 and the first armature can also be simplified. The hollow orter part and the first armature can in practice be much closer together provided that they guarantee sufficient decoupling between the magnetic circuits corresponding to tilting and those corresponding to centering.

By combining the currents flowing in each of the two pairs of tilt wingings, a tilt touque can be obtained at will about any axis in the plane transverse to the reference axis Z—Z. The configuration shown with four tilt windings is simple to implement. It is nevertheless clear that three windings are sufficient for tilting about any axis in this transverse plane.

Note that the central portion of the magnetic bearing shown in FIG. 15 differs from the magnetic bearing shown in FIG. 1 because the hollow outer part is closed at the top, in other words there is only one opening, at the bottom, through which passed a member for connection the inner part to the remainder of the body.

Of course, the bearing shown in FIG. 1 or a bearing conforming to the central part of FIG. 15 can be combined with means for controlling tilting and/or means for controlling rotation about the reference axis Z—Z. Note that in some applications only centering with respect to the axes is necessary, however, without any form of tilt control being necessary. In this latter case, a bearing including only the members shown in FIG. 1 suffices.

Figure 17:
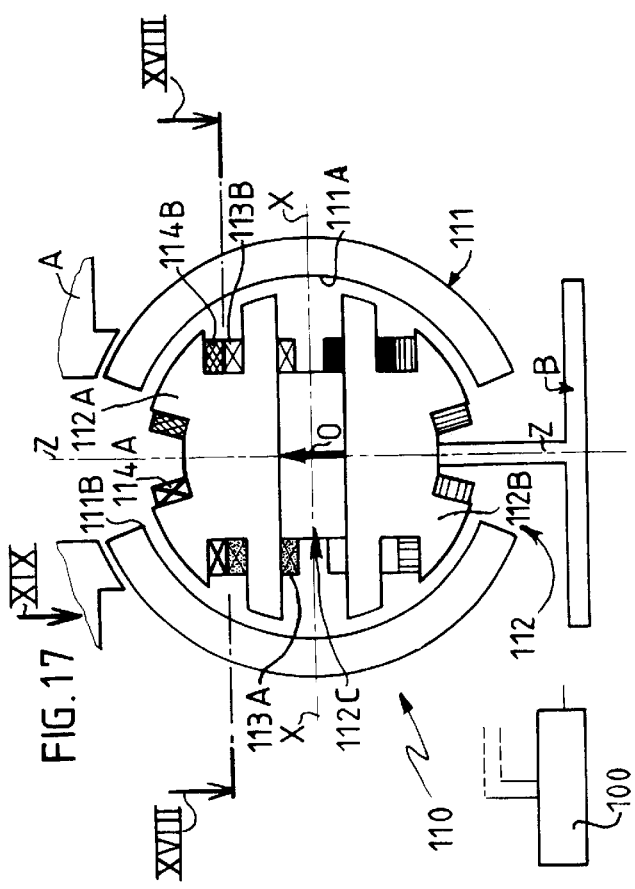
FIG. 17 is a view of a second ball joint type magnetic bearing according to the invention in section in a plane containing a reference axis Z—Z.

FIG. 17 shows a second magnetic bearing 110 for centering a first body A which can tilt within a range of relative movement of at least 5° about a center O of tilting relative to a second body B having a vertical reference axis Z—Z passing through the center of tilting.

The magnetic bearing has a hollow outer part 111 attached to the first body A and an inner part 112 attached to the second body B.

The hollow outer part 111 has an inside surface 111A whose shape is a portion of a sphere substantially concentric with the center O of tilting. The hollow outer part extends completely around the reference axis Z—Z on both sides of a transverse plane perpendicular to the reference axis and passing through the center O of tilting. In FIG. 17, the transverse plane is defined by an axis X—X transverse to the reference axis Z—Z at the point O.

The hollow outer part 111 is at least partly made from a ferromagnetic material of any appropriate type known in the art.

Its inside surface has an axis of symmetry which is not separately identified in the drawings because it is coincident with the reference axis Z—Z when the hollow outer part is correctly centered relative to the center of tilting and has zero tilt.

The inside surface extends angularly relative to the center of tilting as far as two circular edges 111B and 111C centered on the axis of symmetry and perpendicular to it. The angular amplitude of this inside surface is advantageously large, at least 50° in total. The aforementioned two edges preferably have the same radius.

The inside part 112 comprises two separate members 112A and 112B on respective opposite sides of the transverse plane defined above and separated in the direction parallel to the reference axis by a space 112C which has a high reluctance.

Each member comprises a plurality of (at least three) ferromagnetic areas offset angularly around the reference axis and each area defines two air-gaps in conjunction with the inside surface 111A of the hollow outer part 111 and has at least one specific winding adapted to generate magnetic flux lines closing across the two air-gaps. In the example shown, each ferromagnetic area has two windings 113A and 114A, 113B and 114B, 113C and 114C, and 113D and 114D off set in the direction parallel to the reference axis.

Figure 19:
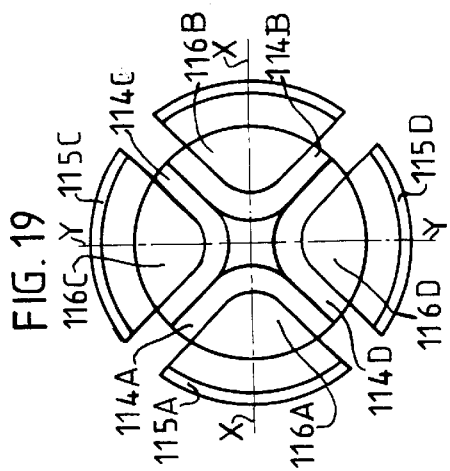
FIG. 19 is a view of the inner part of the magnetic bearing from FIG. 17, as seen from above in the direction of the arrow XIX.
Figure 18:
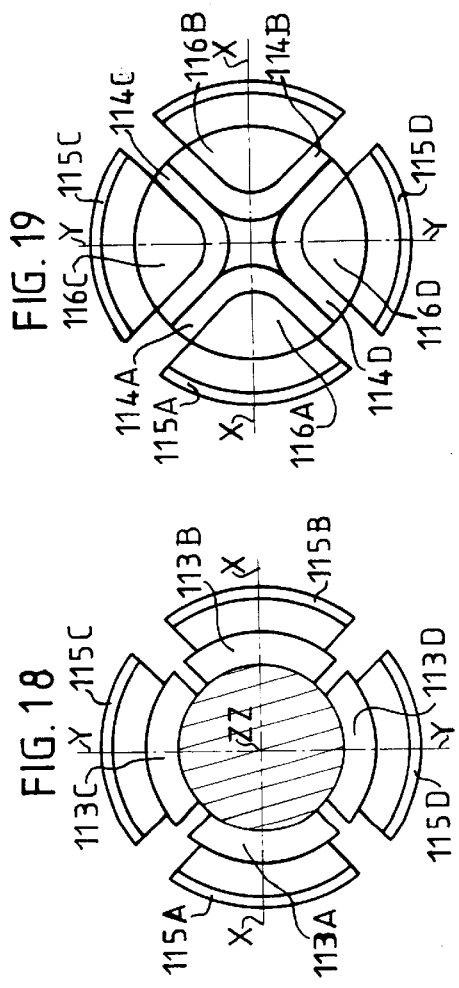
FIG. 18 is a view of the inner part of the bearing in cross-section taken along the line XVIII—XVIII in FIG. 17.
Figure 34:
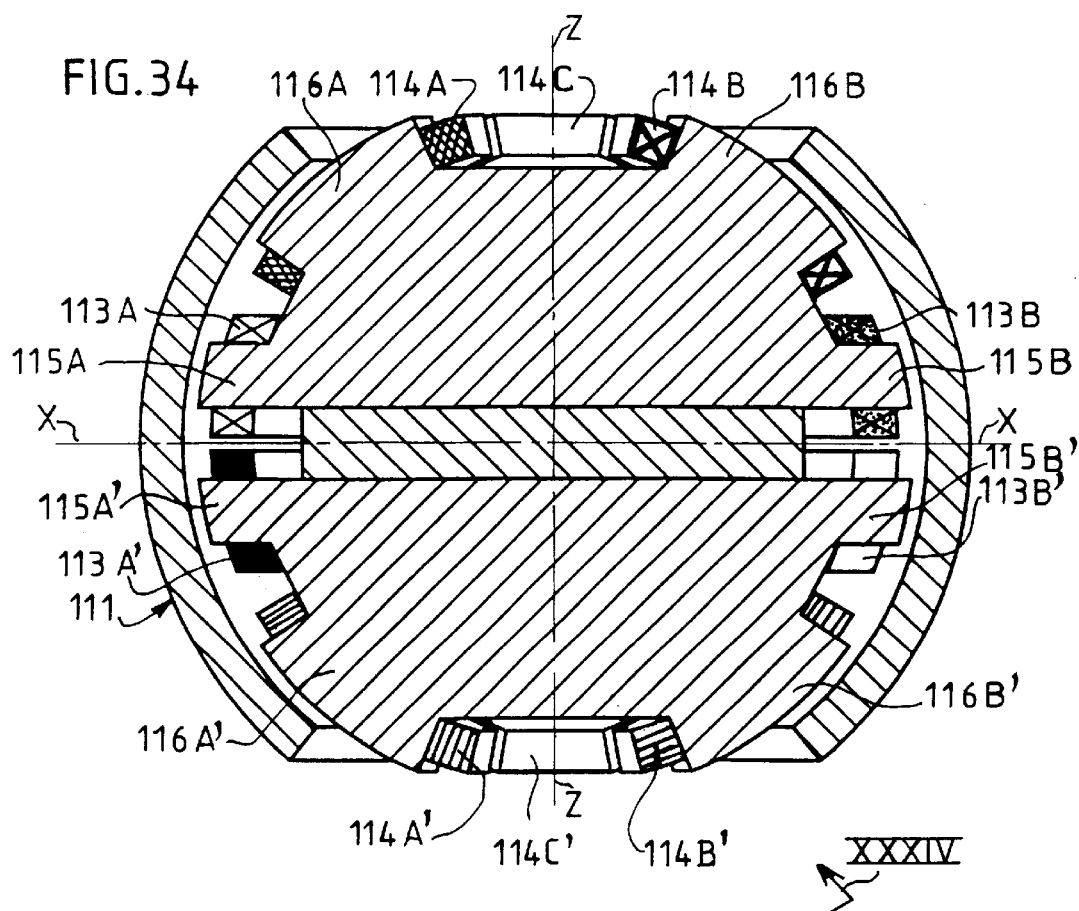
FIG. 34 is a view in axial section of a bearing in accordance with the invention conforming to the FIG. 17 diagram.
Figure 35:
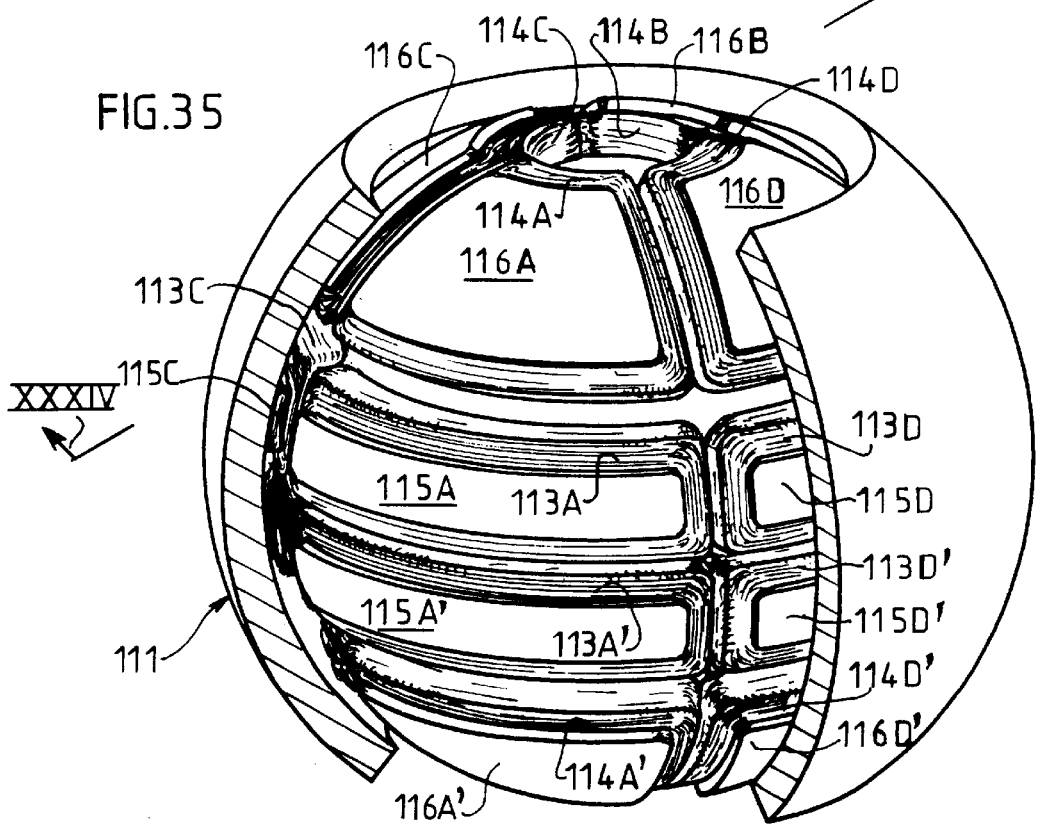
FIG. 35 is a perspective view of this bearing with its outer part partially cut away.

In the embodiment shown in FIG. 17, and as can be seen in FIGS. 18 and 19, the plurality of ferromagnetic areas is preferably formed of two pairs of diametrally opposed ferromagnetic areas offset angularly 90° about the reference axis (see also FIGS. 34 and 35).

To be more precise, there is one pair of ferromagnetic areas aligned with the centering axis X—X in FIG. 17 and one pair of ferromagnetic areas for centering with respect to a third axis Y—Y (FIGS. 18 and 19) perpendicular to the aforementioned axes X—X and Z—Z.

Each ferromagnetic area of each member has first and second projections 115A to 115D and 116A to 116D directed towards the inside surface 111A of the hollow outer part to form the air-gaps of this ferromagnetic area. If the ferromagnetic area has only one winding, it is advantageously wound round one of these projections. However, in this example there are two windings in each area and each projection has one of these two windings wound around it.

To be more precise, and as seen in FIGS. 17 to 19, the upper member 112A (note that what follows is also valid for the lower member 112B) includes an annular series of four primary projections 115A, 115B, 115C and 115D whose edges, centered at the center O of tilting, define one of the two air-gaps of each ferromagnetic area and have the primary windings 113A to 113D wound around them and, at a distance from this first annular series of four projections, a second series formed of the aforementioned four projections 116A to 116D, which are referred to as secondary projections, whose edges are also centered on the center of tilting and which are have the other windings 114A to 114D, which are referred to as secondary windings, wound around them.

The edges of the various projections are preferably portions of a common sphere so that all the air-gaps have the same thickness.

The various ferromagnetic areas of each member can be separate. However, for simplicity, the various ferromagnetic areas are parts of a common ferromagnetic member (here the member 112A as a whole).

As seen in FIGS. 17 to 19, the windings 113A to 113D wound around the first projections are substantially adjacent in the circumferential direction. The same advantageously applies to the other windings 114A to 114D. Also, the two series of windings are preferably themselves adjacent. Thus all of the space between the projections is occupied by the windings.

FIG. 17 shows that the specific windings 113A to 113D extend along a cylindrical portion of the member 112A. Of course, these specific windings can be disposed in a configuration closer to a polygon.

Each of the windings is connected to an excitation circuit 100 adapted to apply an appropriate excitation current to each winding.

In the example shown in FIG. 17, the space 112C between the two members 112A and 112B is occupied by a permanent magnet which is axially magnetized in the upward direction. The reluctance of this magnet prevents flux lines generated by the group of windings of either member crossing this space.

In a different embodiment, shown in FIGS. 28 to 33, the space 112C can be free of magnets, essentially constituting a wide air-gap having the required reluctance. Of course, the members 112A and 112B can be totally independent of each other if they are respectively fixed from below and from above through each of the circular edges 111B or 111C. The foregoing remarks concerning the existence of an air-gap with very high reluctance remain valid if there is a connection (as symbolized by a single thick line in FIGS. 28 to 33) for fastening the members 112A and 112B together, provided that the connection has sufficient reluctance to prevent significant circulation of flux lines generated by the windings.

The hollow outer part extends angularly (as seen from the center of tilting) both sides of the transverse plane over at least 50° in total, which allows a substantial range of angular movement.

The second projections 116A to 116D of each member have edges which are advantageously globally trapezoidal portions of a common sphere centered at the center of tilting (see FIG. 19) and these trapezoidal portions are very close to the reference axis on one side. The windings 114A to 114D practically join near this reference axis. The other projections 115A to 115D preferably have globally rectangular edges which are portions of the same sphere. If the edges of all the projections of each member are portions of a common sphere all the air-gaps are normally equal and the inner part has the overall shape of a ball (see FIG. 35).

FIGS. 20 to 27 show either magnetic flux lines or resulting forces in the air-gaps for various winding excitation configurations.

To make the figures easier to read, windings of which only the edge can be seen are represented differently for each winding.

Figure 20:
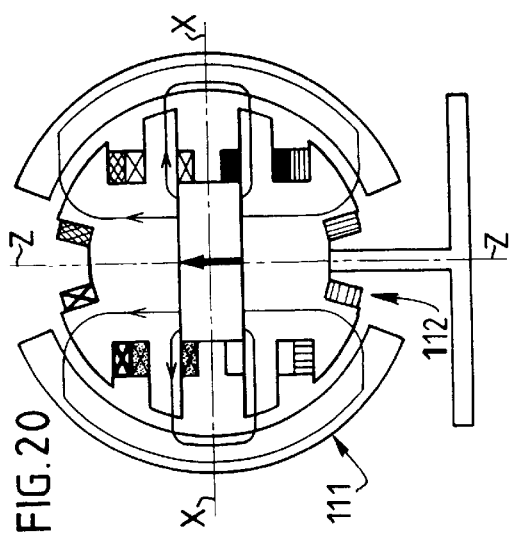
FIG. 20 is a view analogous to that of FIG. 17, showing magnetic flux lines generated by the central magnet.

For example, in FIG. 20, two pairs of windings of the upper member 112A are readily identified, namely the diametrally opposed windings 113A and 114A (on the left) and 113B and 114B (on the right).

It will be remembered that, by convention, a circle containing a dot near the edge of a winding indicates that a current is flowing in the direction out of the plane of the drawing and that a circle containing a cross corresponds to the opposite current direction.

What has just been stated is valid for the lower member 112B (since, in this example, it has the same geometry as and is disposed symmetrically to the upper member about the transverse plane passing through the center O) and the windings of the lower member are identified by the same reference numbers as the windings of the upper member but "primed".

FIG. 20 includes a simplified representation of the magnetic flux lines generated by the permanent magnet occupying the space 112C between the members 112A and 112B.

Note, on the right and on the left in FIG. 20, small magnetic loops crossing the air-gaps nearest the transverse plane, near the projections 115A and 115B in the case of the upper member, and larger magnetic loops crossing the air-gaps at the ends, formed between the hollow outer part and the annular projections 116A and 116B at the ends.

The passage of magnetic flux lines across an air-gap produces a force transverse to the air-gap whose amplitude increases in direct proportion to the number of magnetic flux lines crossing the air-gap. Also, if an air-gap can have a varying cross-section, simple reasoning shows that there additionally appears in this air-gap a tangential force in the direction tending to maximize the cross-section of the air-gap.

Figure 21:
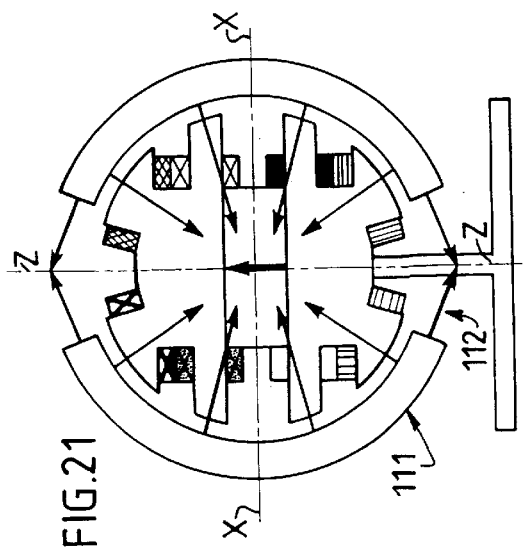
FIG. 21 is a view similar to that of FIG. 17, with arrows whose amplitude and direction correspond to the forces generated by the magnetic fluxes crossing the air-gaps.

Because the air-gaps of all the projections are the same, which implies that the magnetic flux lines generated by the magnet are uniformly distributed all around the reference axis, it is clear that, when the hollow outer part is correctly centered relative to the center O of tilting, the passage of the magnetic flux lines across the various air-gaps generates forces in those air-gaps on the hollow outer part which are symmetrical, on the one hand about the reference axis and on the other hand about the horizontal transverse plane. This is shown in FIG. 21 by a set of arrows all converging towards the center O of tilting and which have moduli which are diagrammatically represented as being the same. For the hollow outer part, the resultant force is of zero amplitude: the hollow outer part does not move.

Figure 22:
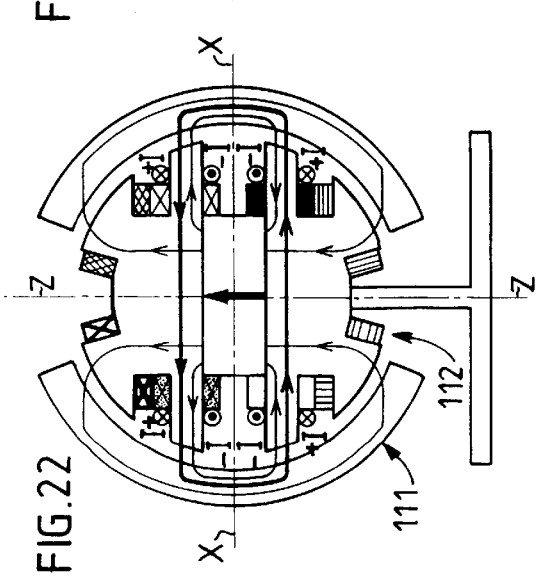
FIG. 22 is a view analogous to that of FIG. 20, also showing flux lines generated by the application of excitation currents to certain windings for centering with respect to an axis transverse to the reference axis.

FIG. 22 shows the flux lines crossing the air-gaps when two windings (radially opposed and close to the transverse plane) of each of the members which are symmetrically disposed with respect to the transverse plane, i.e. the windings 113A, 113B and 113A', 113B' in FIG. 17, are energized by the excitation circuit 100 shown in FIG. 17 to generate flux lines in the upper member crossing the air-gaps nearest the transverse plane in a common direction (here towards the left) and flux lines in the lower member crossing the corresponding two air-gaps in the opposite direction (towards the right in the FIG. 22 example). Because, as already mentioned, the lower and upper members are solid ferromagnetic material components, the flux lines generated by the aforementioned windings can combine, as shown in FIG. 22, to form a single magnetic loop passing through the upper member towards the left, descending in the hollow outer part, passing through the lower member towards the right and rising in the hollow outer part.

Figure 23:
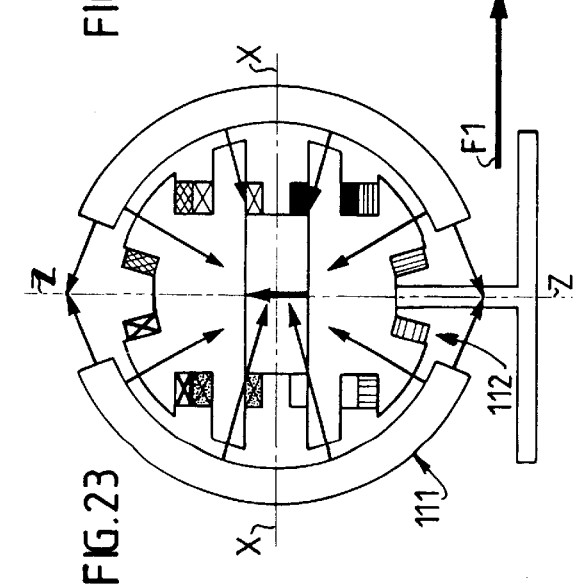
FIG. 23 is a view analogous to that of FIG. 21 in which the amplitude of the arrows is modified relative to those shown in FIG. 22 because of the flux lines generated by the excitation currents in the windings.

The symmetry of the magnetic fluxes crossing the air-gaps at the ends between the hollow outer part and the second projections is preserved. On the other hand, in the case of the air-gaps nearest the transverse plane of symmetry, the magnetic loop generated by applying excitation currents to the aforementioned windings clearly increases the flux crossing the air-gaps on the left and reduces the magnetic flux crossing each of the air-gaps on the right. As shown in FIG. 23, this increases the forces generated at the left-hand air-gaps and reduces the forces generated at the right-hand air-gaps. The resultant force F1 (FIG. 23) is substantially parallel to the transverse plane. FIGS. 22 and 23 therefore correspond to a mode of excitation of the windings adapted to center the hollow outer part transversely to the reference axis and with respect to the axis X—X in FIGS. 17 and 18. Clearly, by applying excitation currents to the other pairs of windings, namely those on the axis Y—Y in FIG. 18, a transverse centering force with respect to the axis Y—Y can be obtained in a similar manner. It is of course possible to combine excitation currents in each of the pairs of windings, as required, to have at all times an appropriate centering force in the transverse plane perpendicular to the reference axis Z—Z.

Figure 24:
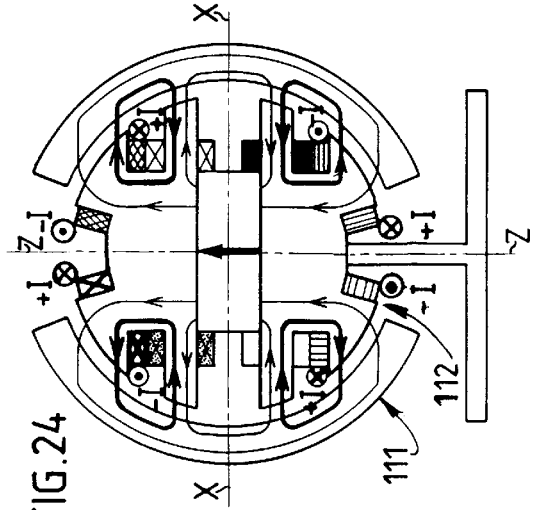
FIG. 24 is another view similar to that of FIG. 20, showing other flux lines generated by currents in other windings for centering with respect to the reference axis.
Figure 25:
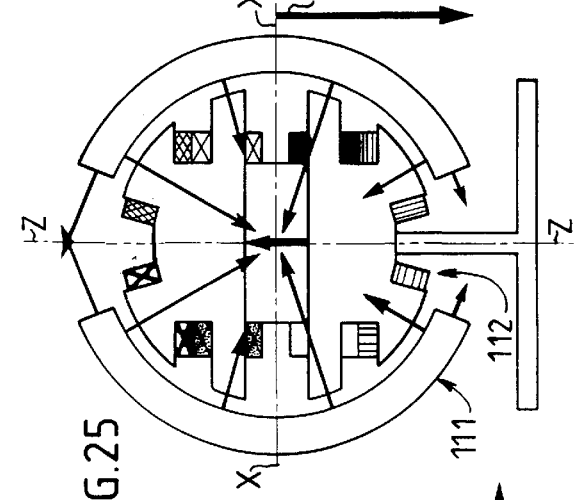
FIG. 25 is a view similar to that of FIG. 21, in which the amplitude of the arrows allows for the flux lines generated by the windings in FIG. 24.

FIG. 24 corresponds to another mode of excitation of the windings, in which two secondary windings 114A and 114B and 114A' and 114B' of each member are excited symmetrically about the reference axis and the transverse plane, so that the flux lines leave each member via the secondary air-gaps (those farthest from the transverse plane). Clearly there is an overall increase in the magnetic flux across the upper secondary air-gaps and a reduction of the flux in the lower secondary air-gaps. Similarly, the flux is reduced in the primary air-gaps of the upper member but there is an increase in the flux lines crossing the primary air-gaps of the lower member. Because the air-gaps crossed by the maximum magnetic flux lines in the upper member are less inclined to the reference axis than the air-gaps crossed by the maximum magnetic flux lines the lower member, there is a downward resultant force in the direction parallel to the reference axis. In fact, the tangential forces generated in the secondary air-gaps (those farthest from the transverse plane) are greater in the upper member than in the lower member but the upward overall resultant force is weak compared to the aforementioned resultant of the forces transverse to the air-gaps. The resultant of the transverse and tangential forces is a vertical downward force F2. FIGS. 24 and 25 therefore correspond to a mode of excitation of the windings corresponding to centering of the hollow outer part in the direction parallel to the reference axis.

All the secondary windings of each member can be excited (rather than only one pair of them) to increase the centering force in the direction parallel to the reference axis.

A centering force in the opposite direction can clearly be obtained by reversing the direction of the excitation currents in the secondary windings.

Note that in the FIG. 22 embodiment only the primary windings are electrically energized for centering in the direction parallel to the transverse plane. It is nevertheless possible to achieve the same centering by exciting only the secondary windings.

The same can apply to centering in the direction parallel to the reference axis, since flux lines identical to those shown in FIG. 24 can be obtained by exciting the primary windings rather than the secondary windings.

Consequently, it is clear that centering forces along any of three axes X—X, Y—Y, Z—Z can be obtained with a single winding in each ferromagnetic area. It is nevertheless clear that the presence of the two windings in each area makes centering with respect to the axis Z—Z very easy.

The foregoing description was easy given the symmetry of the two members and the disposition of the windings, and given that each of the members includes two pairs of windings disposed on respective opposite sides of the reference axis and angularly offset by 90°.

It is nevertheless clear that, at the cost of a slight complication in how the excitation currents of the various windings are controlled, it is possible to obtain centering forces transverse to the reference axis and centering forces parallel to the reference axis provided that each of the upper and lower members includes at least three windings, in three ferromagnetic areas, disposed symmetrically or otherwise about the transverse plane in each of the members.

Figure 26:
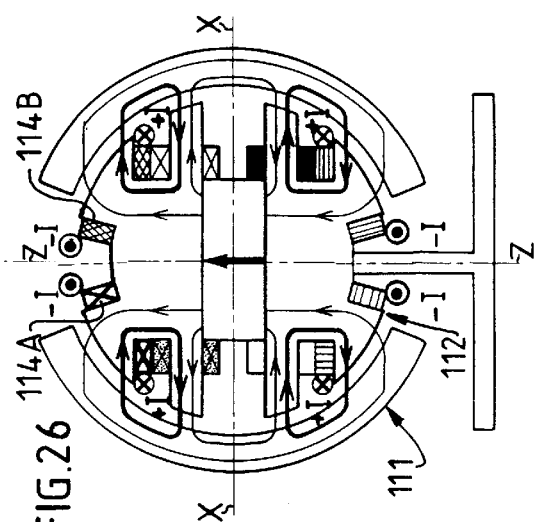
FIG. 26 is a further view similar to that of FIG. 20, showing other flux lines generated by currents in other windings for controlling tilting.

FIG. 26 shows a further winding excitation mode, in which two secondary windings 114A and 114B of the upper member are excited to generate fluxes in the secondary air-gaps directed towards the right and two secondary windings of the lower member are excited to generate a flux in the lower secondary air-gaps directed towards the left.

Figure 27:
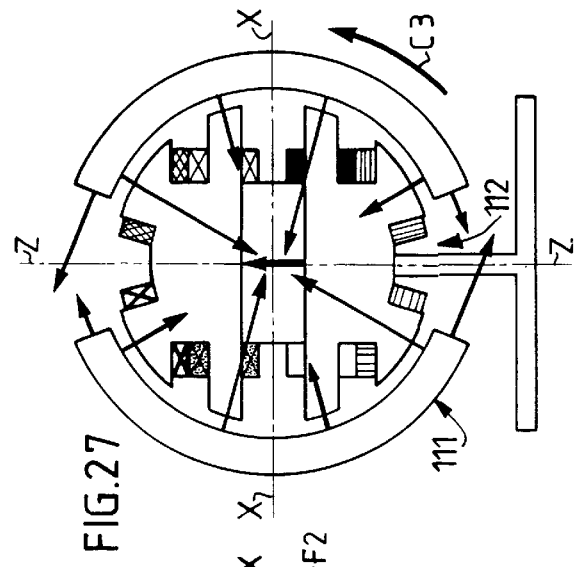
FIG. 27 is a view similar to that of FIG. 21, with arrows whose amplitude allows for the flux lines generated by the windings from FIG. 26.

As a result the fluxes in the upper right secondary air-gap, the upper left primary air-gap, the lower right primary air-gap and the lower left secondary air-gap are increased and the fluxes in the other air-gaps in the same plane passing through the reference axis are reduced. However, the resultant of the various resulting forces across the air-gaps (towards the center of tilting) is zero. On the other hand, the tendency to increase the cross-section of the secondary air-gaps is at a maximum in the upper right secondary air-gap and in the lower left air-gap but at a minimum in the other secondary air-gaps: note that the result of this is a non-zero amplitude torque C3 corresponding to rotation in the anti-clockwise direction. FIGS. 26 and 27 therefore correspond to a tilt control configuration.

As previously, it is possible to control the flux lines necessary for this tilting by exciting the primary windings, especially if the ferromagnetic areas are magnetically isolated from each other. It is nevertheless clear that exciting the secondary windings provides better control over the flux lines crossing the secondary air-gaps and therefore improved control of tilting. It nevertheless remains possible to use only one winding in each ferromagnetic area to generate the centering forces as well as the tilt control forces.

FIGS. 28 to 33 are variants of FIGS. 22 to 27.

From a structural point of view, the magnetic bearing shown in FIGS. 28 to 33 is simpler than that shown in the previous figures because the space between the lower and upper members is essentially empty, forming a wide air gap occupied only by a narrow connector for fastening the upper and lower members together and in theory made of a non-ferromagnetic material.

Furthermore, as emerges below, FIGS. 28 to 33 show that it is possible to apply centering forces with respect to any axis by exciting a smaller number of windings than described with reference to FIGS. 22 to 27.

Figure 28:
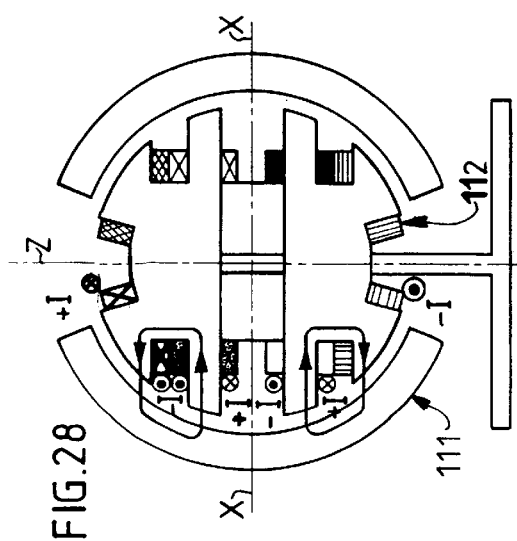
FIGS. 28 and 29 are respectively variants of FIGS. 22 and 23.
Figure 29:
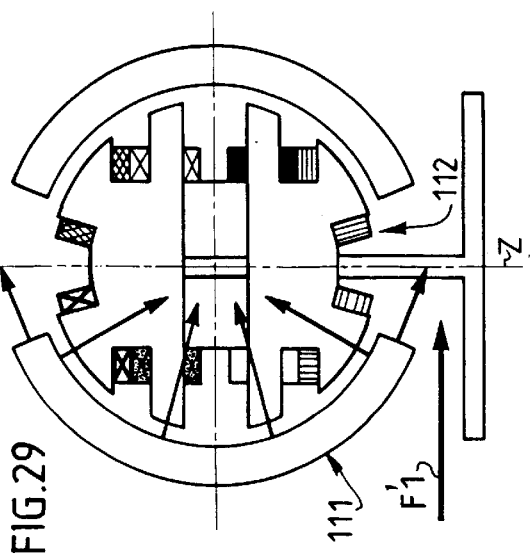

Accordingly, in the FIG. 28 example, two specific windings of each of the members are activated, namely the primary winding on the left 113A or 113A' and the secondary winding 114A or 114A' in FIG. 20. Here these windings are electrically energized to generate flux lines which cross air-gaps in each individual ferromagnetic area to which the previously mentioned two magnetic windings relate, which magnetic flux loops are symmetrical about the transverse plane. As shown in FIG. 29, this generates forces towards the center of tilting in the air-gaps on the left (and tangential forces towards the right), while there is no flux in the air-gaps in the right-hand part so there is no force towards or away from the center of tilting. Because of the symmetrical configuration of the air-gaps on either side of the transverse plane, this generates a resultant force F'1 parallel to the transverse plane, directed towards the right. It therefore suffices to activate four well-chosen specific windings to center the hollow outer part with respect to an axis transverse to the reference axis Z—Z.

Figure 30:
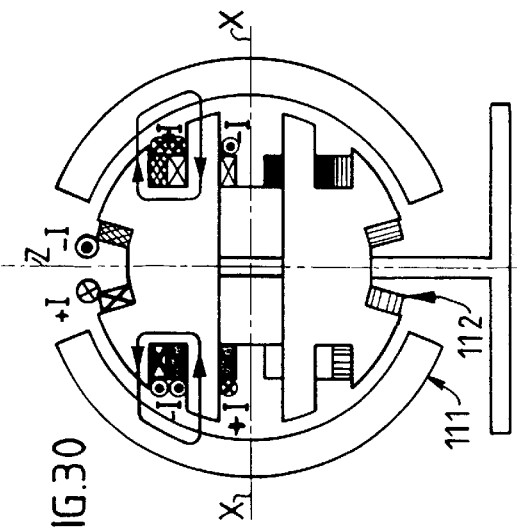
FIGS. 30 and 31 are respectively variants of FIGS. 24 and 25.
Figure 31:
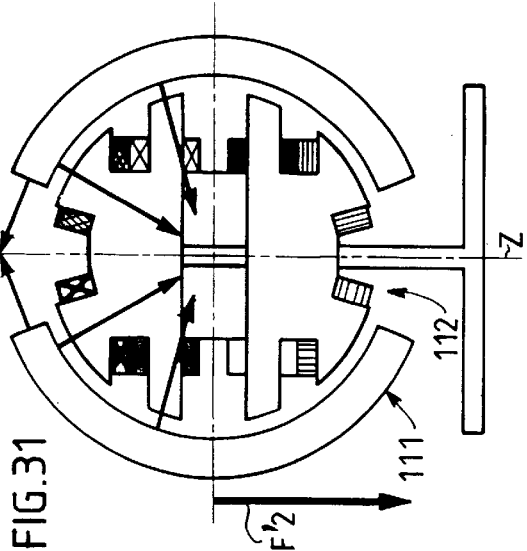

In FIG. 30, the secondary winding of only one member, namely the upper member, are electrically activated, which produces flux lines only in the air-gaps of the upper member. As can be seen in FIG. 31, this generates forces in the air-gaps of the upper member directed towards the center of tilting. This produces a vertical downward resultant force F'2 in the direction parallel to the reference axis Z—Z (the resultant of the tangential forces, having a vertical upward component, is very much lower than that of the radial forces).

Once again, as explained with reference to FIGS. 24 and 25, it would be possible to obtain this centering in the direction parallel to the reference axis by activating two or even all the windings of only one of the members.

It is of course easy to generate large centering forces in the direction parallel to the reference axis, if required, by simultaneously activating primary and secondary windings of one or both ferromagnetic members.

Figure 32:
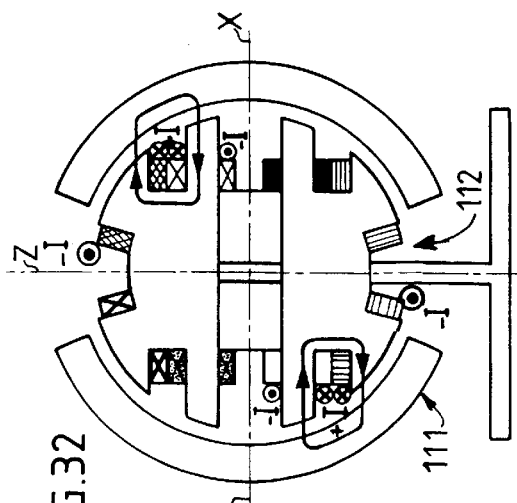
FIGS. 32 and 33 are respectively variants of FIGS. 26 and 27.
Figure 33:
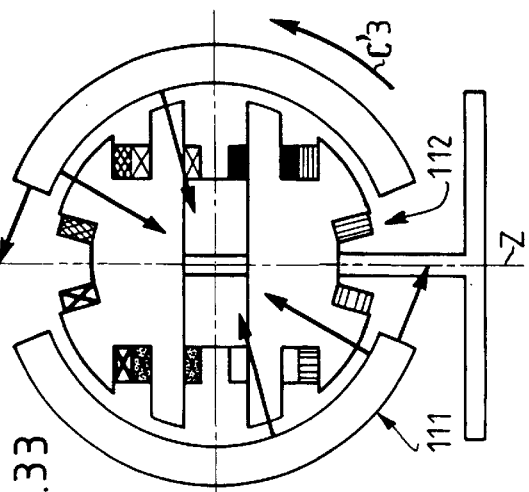

Unlike that of FIG. 26, the electrical excitation mode of FIG. 32 implies the excitation of the primary and secondary windings of two ferromagnetic areas on opposite sides of the center of tilting so that each winding generates flux lines which exit via the secondary air-gaps of these two areas and produces a torque C'3.

Once again, it is clearly possible to generate the same pattern of flux lines with a single winding in each ferromagnetic area.

What is claimed is:

1. A magnetic bearing for centering a first body, the first body being mobile in tilting within an angular range of movement of at least 5° about a center of tilting, relative to a second body having a reference axis passing through the center of tilting, the magnetic bearing including:
    a hollow outer part at least part of which is made from a ferromagnetic material, wherein the hollow outer part is attached to the first body and has an inside surface whose shape is a portion of a sphere whose center is substantially coincident with the center of tilting, and wherein the hollow outer part extends around a mobile reference axis having an inclination that can be zero to the reference axis, such that the hollow outer part extends on either side of a transverse plane that is perpendicular to the reference axis and passes through the center of tilting;
    an inner part that is attached to the second body, wherein the inner part includes two separate members that are disposed on respective opposite sides of the transverse plane, wherein each of the two separate members includes a plurality of ferromagnetic areas, each ferromagnetic area having a group of windings that includes a specific winding, wherein the ferromagnetic areas are offset angularly about the reference axis, wherein each ferromagnetic area defines in conjunction with the inside surface of the hollow outer part two air-gaps offset relative to the reference axis, and wherein the specific winding of each ferromagnetic area generates magnetic flux lines closing across a respective one of the two air-gaps, and wherein the two separate members are separated in a direction parallel to the reference axis by a space having a reluctance that prevents magnetic flux lines generated by at least one of the group of windings of one of the two separate members from crossing the space; and
    an excitation circuit for selectively applying excitation currents to the group of windings of each member to generate magnetic fields in the air-gaps to center the hollow outer part relative to the inner part in directions transverse to and parallel to the reference axis.

2. A bearing according to claim 1, wherein said space is occupied by a permanent magnet that is permanently magnetized in a direction parallel to the reference axis.

3. A bearing according to claim 1, wherein said space is a free space forming a fixed air-gap.

4. A bearing according to claim 1, wherein the ferromagnetic areas of each member are part of a common ferromagnetic component.

5. A bearing according to claim 1, wherein the ferromagnetic areas of the two members are symmetrical about the transverse plane.

6. A bearing according to claim 1, wherein the plurality of ferromagnetic areas of each member includes four ferromagnetic areas divided into two pairs of areas diametrically opposed with respect to the reference axis and offset by 90°.

7. A bearing according to claim 1, wherein the hollow outer part has an angular amplitude of at least approximately plus or minus 50° relative to the plane perpendicular to the reference axis.

8. A bearing according to claim 7, wherein each ferromagnetic area of each member has first and second projections directed towards the inside surface of the hollow outer part to form the respective two air-gaps of that area, and wherein the first and second projections face the inside surface of the hollow outer part regardless of the inclination in tilting of the hollow outer part relative to the inner part within said range of movement.

9. A bearing according to claim 8, wherein the first and second projections of the ferromagnetic areas of a same member are part of a common annular projection centered on the reference axis.

10. A bearing according to claim 8, wherein the group of windings of each member further includes an additional winding wound around that member between the first and second projections of the ferromagnetic areas of that member and connected to the excitation circuit for selectively applying excitation currents to the additional windings of the members to generate magnetic fields in the air-gaps to apply to the hollow outer part centering forces in the direction parallel to the reference axis.

11. A bearing according to claim 8, wherein the excitation circuit is designed for selective application of excitation currents to the specific windings of the ferromagnetic areas of the members to generate magnetic fields in the air-gaps adapted to apply to the hollow outer part forces in the direction parallel to the reference axis.

12. A bearing according to claim 8, wherein the hollow outer part has a single opening substantially centered on the reference axis opposite a portion in which that part intersects that axis.

13. A bearing according to claim 8, further including, externally of the hollow outer part:
    two permanently magnetized rings that are carried by a first ferromagnetic armature attached to the hollow outer part around the reference axis, wherein each of the two permanently magnetized rings has a magnetization direction that passes at all points at least approximately through the reference axis, wherein each of the permanently magnetized rings is parallel to the other and offset in the direction parallel to the reference axis on respective opposite sides of the center of tilting and has free edges substantially constituting portions of a common sphere centered on the center of tilting; and
    a plurality of annular tilt windings that are attached to the inner part, wherein each of the annular tilt windings includes two groups of circumferential strands respectively that face each of the permanently magnetized rings regardless of an orientation of the hollow outer part relative to the center of tilting within said range of angular movement in tilting of at least 5' and that are carried by a second ferromagnetic armature defining in conjunction with the permanently magnetized rings air-gaps whose thickness remains constant throughout said range of angular movement in tilting.

14. A bearing according to claim 13, wherein the rings have magnetization directions that at all points pass at least approximately through the center of tilting.

15. A bearing according to claim 13, wherein the two permanently magnetized rings have the same diameter and are symmetrical to each other about the center of tilting and the tilt windings are each symmetrical about the transverse plane.

16. A bearing according to claim 13, wherein the two permanently magnetized rings are spaced by a distance corresponding to an angular offset of at least 10° relative to the center of tilting in a plane containing the reference axis.

17. A bearing according to claim 13, wherein the two groups of circumferential strands of each of the tilt windings are disposed adjacently on a spherical surface of the second armature centered on the center of tilting.

18. A bearing according to claim 13, wherein the two permanently magnetized rings have an angular amplitude greater than that of each group of circumferential strands of each winding in a plane passing through the reference axis.

19. A bearing according to claim 13, wherein the two permanently magnetized rings have an angular amplitude less than that of each group of circumferential strands of each winding in a plane passing through the reference axis.

20. A bearing according to claim 13, wherein the second armature is disposed radially between the hollow outer part and the first armature.

21. A bearing according to claim 1, wherein each ferromagnetic area of each member has first and second projections directed towards the inside surface of the hollow outer part to form the respective two air-gaps of that area, and wherein one of said first and second projections has said respective specific winding wound around it.

22. A bearing according to claim 21, wherein the specific windings carried by each member are adjacent each other at least in a circumferential direction.

23. A bearing according to claim 21, wherein the first and second projections of each of the ferromagnetic areas of a same member each have an edge whose shape is a portion of a common sphere centered on the center of tilting.

24. A bearing according to claim 21, wherein the first and second projections of the two members have edges which are portions of a common sphere centered on the center of tilting and all the air-gaps normally have the same thickness.

25. A bearing according to claim 8, wherein:

the hollow outer part is made from a ferromagnetic material at least in proximity of the first and second projections and extends around the mobile reference axis as far as two circular edges centered on that mobile axis, and all of the first projection of each ferromagnetic area of the inner part faces the inside surface of the hollow outer part regardless of the inclination in tilting of the hollow outer part relative to the inner part within said angular range of movement in tilting and the second projection is in the vicinity of one of the circular edges of the hollow outer part so that the second projection is only partly facing that one circular edge, in a proportion depending on the inclination of the mobile reference axis relative to the reference axis of the fixed body.

26. A bearing according to claim 25, wherein each ferromagnetic area has two specific windings respectively wound around each of the first and second projections.

27. A bearing according to claim 25, wherein the second projections of the ferromagnetic areas of a same member each have an edge a shape of which is a globally trapezoidal portion of a common sphere centered on the center of tilting and each of these globally trapezoidal portions has one side close to the reference axis.

28. A bearing according to claim 25, wherein the pluralities of second projections on the two members are symmetrical about the transverse plane and the two circular edges of the inside surface of the hollow outer part have the same radius.

29. The bearing according to claim 1, wherein each of the two separate members includes three ferromagnetic areas.

* * * * *